(12) United States Patent
Kazmierczak

(10) Patent No.: US 6,549,380 B2
(45) Date of Patent: Apr. 15, 2003

(54) DATA HANDLING SYSTEM WITH FLUX-DIRECTING VOICE COIL MOTOR

(75) Inventor: Frederick Frank Kazmierczak, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/836,800

(22) Filed: Apr. 17, 2001

(65) Prior Publication Data

US 2001/0048576 A1 Dec. 6, 2001

Related U.S. Application Data

(60) Provisional application No. 60/198,163, filed on Apr. 17, 2000.

(51) Int. Cl.[7] .............................. G11B 5/55; H02K 33/18
(52) U.S. Cl. ........................................ 360/264.8; 310/13
(58) Field of Search .......................... 360/78.13, 264.7, 360/264.8, 264.9, 265; 310/12, 13

(56) References Cited

U.S. PATENT DOCUMENTS

| | | | |
|---|---|---|---|
| 4,620,252 A | 10/1986 | Bauck et al. ................ 360/106 |
| 4,939,711 A | 7/1990 | Yoda ............................ 369/13 |
| 5,016,131 A | 5/1991 | Riggle et al. ................ 360/106 |
| 5,247,410 A | 9/1993 | Ebihara et al. ............. 360/106 |
| 5,260,618 A | 11/1993 | Dunfield et al. ............. 310/154 |
| 5,296,767 A | 3/1994 | Asselin ......................... 310/13 |
| 5,315,466 A * | 5/1994 | Nishimoto et al. .......... 360/106 |
| 5,459,362 A * | 10/1995 | Dunfield et al. ............. 310/154 |
| 5,483,397 A | 1/1996 | Gifford et al. ............ 360/97.01 |
| 5,621,591 A | 4/1997 | Rahimi et al. ............... 360/106 |
| 5,659,215 A | 8/1997 | Dunfield et al. ............. 310/154 |
| 5,684,349 A | 11/1997 | Hara et al. ..................... 310/77 |
| 5,875,073 A * | 2/1999 | Andrews et al. .......... 360/265.1 |
| 5,907,453 A * | 5/1999 | Wood et al. .............. 360/97.02 |
| 5,991,124 A * | 11/1999 | Forbord ......................... 360/265 |
| 6,026,064 A | 2/2000 | Izumi et al. ............... 369/44.22 |
| 6,122,139 A | 9/2000 | Sri-Jayantha et al. ..... 360/97.02 |
| 6,304,421 B1 * | 10/2001 | Brown ...................... 360/264.8 |

* cited by examiner

Primary Examiner—Brian E. Miller
Assistant Examiner—Dzung C. Nguyen
(74) Attorney, Agent, or Firm—Merchant & Gould P.C.

(57) ABSTRACT

A data handling system having a voice coil motor having a first magnetically permeable plate and a second magnetically permeable plate is disclosed. The first magnetically permeable plate is coupled to a permanent magnet pair and the second magnetically permeable plate includes a raised plate portion directly opposite the permanent magnet pair. Planar surfaces of the permanent magnet pair and the raised plate portion are substantially parallel to each other and are spaced by an air gap. A voice coil is positioned in the air gap and moves in response to a magnetic interaction between a magnetic field produced by a controlled current through the coil and a magnetic field between the permanent magnet pair and the raised plate portion. The planar surfaces of the permanent magnet pair and the raised plate portion may be substantially identical in shape and surface area.

17 Claims, 5 Drawing Sheets

DATA HANDLING SYSTEM WITH FLUX-DIRECTING VOICE COIL MOTOR

RELATED APPLICATIONS

This application claims priority of U.S. provisional application Ser. No. 60/198,163 filed Apr. 17, 2000.

FIELD OF THE INVENTION

This application relates generally to information handling systems and more particularly to a magnetic circuit of a voice coil motor in an information handling system.

BACKGROUND OF THE INVENTION

One function of a disc drive is reliable storage and retrieval of information. Using one common implementation of a disc drive as an example, data is stored on one or more discs coated with a magnetizable medium. Data is written to the discs by an array of transducers, typically referred to as read/write transducers, mounted to an actuator assembly for movement of the transducers relative to the discs. The information is stored on a plurality of concentric circular tracks on the discs until such time that the data is read from the discs by the read/write transducers. Each of the concentric tracks is typically divided into a plurality of separately addressable data sectors. The transducers are used to transfer data between a desired track and an external environment. During a write operation, data is written onto the disc track and during a read operation the transducer senses the data previously written on the disc track and transfers the information to the external environment. Critical to both of these operations is the accurate locating of the transducer over the center of the desired track.

Conventionally, the transducers are positioned with respect to the disc surfaces by one or more actuator arms controlled through a voice coil motor. The voice coil motor is responsible for pivoting the actuator arms about a pivot shaft, thus moving the transducers across the disc surfaces. The actuator arm thus allows the transducers to move back and forth in an arcuate fashion between an inner radius and an outer radius of the discs. The actuator arm is driven by a control signal fed to a voice coil motor coil coupled to the rear end of the actuator arm.

The coil is immersed in the magnetic field of a magnetic circuit of the voice coil motor. With respect to conventional voice coil motor implementations, the magnetic circuit comprises one or more permanent magnet pairs adjacent to magnetically permeable magnet plates. When current is passed through the coil, an electromagnetic field is established which interacts with the magnetic field of the magnetic circuit such that the coil, as well as the transducer(s), experience direct rotational forces or torques about an axis of a rotatable assembly. Such rotational forces selectively position the transducer over the desired new track or maintain the position of the transducer over the desired current track. A conventional implementation of the magnetic circuit of the voice coil motor is shown in FIG. 3. A second conventional implementation of the magnetic circuit of the voice coil motor is shown in FIG. 4.

A servo control system is used to sense the position of the actuator arm and control the movement of the transducer above the disc using servo signals read from the servo segments on the disc surface in the disc drive. The servo control system relies on servo information stored on the disc. The signals from this information generally indicate the present position of the transducer with respect to the disc, i.e., the current track position. The servo control system uses the sensed information to maintain transducer position or determine how to optimally move the transducer to a new position centered above a desired track. The servo system then delivers a control signal to the coil of the voice coil motor to rotate the actuator arm to position the transducer over a desired new track or maintain the position over the desired current track.

As shown in FIG. 3, in a typical voice coil motor 324 employing two parallel magnet pairs 342 and 344 coupled to an upper magnetically permeable plate 343 and a lower magnetically permeable plate 345, respectively, the lines of magnetic flux 346 generated by the permanent magnet pairs 342 and 344 tend to cross an air gap 348 located between an upper surface 350 of the lower magnet pair 342 and a lower surface 352 of the upper magnet pair 344 in a generally orthogonal direction to surfaces 350 and 352 of the permanent magnet pairs 342 and 344. When these "orthogonal" lines of magnetic flux 346 interact with the flux generated by a coil 326, the resultant torque induced in the VCM 324 is primarily of the direct type, as described above. Put another way, when the flux generated by the parallel magnet pairs 342 and 344 of the VCM 324, interacts with the flux generated by current in the coil 326, balanced forces or torques act upon the VCM 324.

The orthogonal orientation of the flux lines 346 relative to the surfaces 350 and 352 of the permanent magnet pairs 342 and 344 is thought to be due to a "steering" effect the oppositely facing north and south facing magnetic poles 362 and 364 of the permanent magnet pairs 342 and 344 have on the magnetic flux 346. That is, the oppositely facing north and south facing magnetic poles 362 and 364 of the permanent magnet pairs 342 and 344 tend to guide the lines of magnetic flux 346 across the air gap 348 located between the permanent magnet pairs 342 and 344 in a generally orthogonal direction to the surfaces 350 and 352 of the permanent magnet pairs 342 and 344.

In contrast, as shown in FIG. 4, it has been observed that without the guiding influence of the oppositely facing south and north magnetic poles, lines of magnetic flux 446 generated in a VCM 424 having a single magnet pair 444 tend to "fringe" as they cross the air gap 448 between the permanent magnet pair 444 and the upper magnetically permeable plate 440. That is, the lines of magnetic flux 446 generated in the VCM 424 employing a single magnet pair 444 do not typically remain orthogonal to the upper surface 450 of the permanent magnet pair 444. It is believed that when these "non-orthogonal" flux lines interact with the flux generated by the coil 426, the result is unbalanced forces and moments acting on the coil 426. Such unbalanced forces and moments typically lead to an undesirable increase in pitch torque and roll torque in the VCM 424.

Although the conventional implementation shown in FIG. 3 is desirable to somewhat alleviate unbalanced forces and moments associated with non-orthogonal flux lines, the parallel magnet design in FIG. 3 is associated with relatively greater manufacturing costs than the design shown in FIG. 4. In contrast, even though the magnetic circuit implementation shown in FIG. 4 is relatively inexpensive to manufacture when compared to the conventional implementation shown FIG. 3, the design shown in FIG. 4 is associated with potentially unbalanced forces and moments.

SUMMARY OF THE INVENTION

Against this backdrop the present invention has been developed. The present invention relates to a magnetic circuit of a voice coil motor incorporating a single permanent magnetic portion extending from a first plate and a raised plate portion protruding toward the first plate from a second plate. The raised plate portion protrudes from the second plate to interact with the magnetic portion extending from the first plate in order to reduce the occurrence of non-orthogonal flux lines in the voice coil motor. Accordingly, the voice coil motor employs a single magnetic portion and an opposite pole piece shaped to generate orthogonal, as opposed to non-orthogonal, flux lines relative to the surface of the permanent magnetic portion to ensure relatively balanced forces and moments acting upon the coil of the voice coil motor.

In accordance with one embodiment, a disc drive includes a voice coil motor for positioning a transducer over a data disc surface of a data storage disc rotatably mounted on a base plate. An actuator, which is coupled to the voice coil motor, is mounted on the base plate adjacent the disc for moving the transducer over the disc surface. The voice coil motor includes a voice coil, a first plate, a permanent magnet pair coupled to the first plate, a second plate having a planar surface and a raised plate portion protruding from the second plate planar surface toward the permanent magnet pair. The permanent magnet pair defines a magnetic planar surface and produces a magnetic flux. The second plate is positioned in spaced relation to the first plate thereby forming an air gap between the raised plate portion and the permanent magnet pair through which the voice coil is free to move. The raised plate portion defines a raised planar surface opposite the magnetic planar surface such that the magnetic flux passing across the air gap between the permanent magnet pair and the raised plate portion is substantially uniformly directed orthogonal to the magnetic planar surface.

These and various other features, as well as advantages which characterize the present invention, will be apparent from a reading of the following detailed description and a review of the associated drawings.

DETAILED DESCRIPTION

Figure 1:
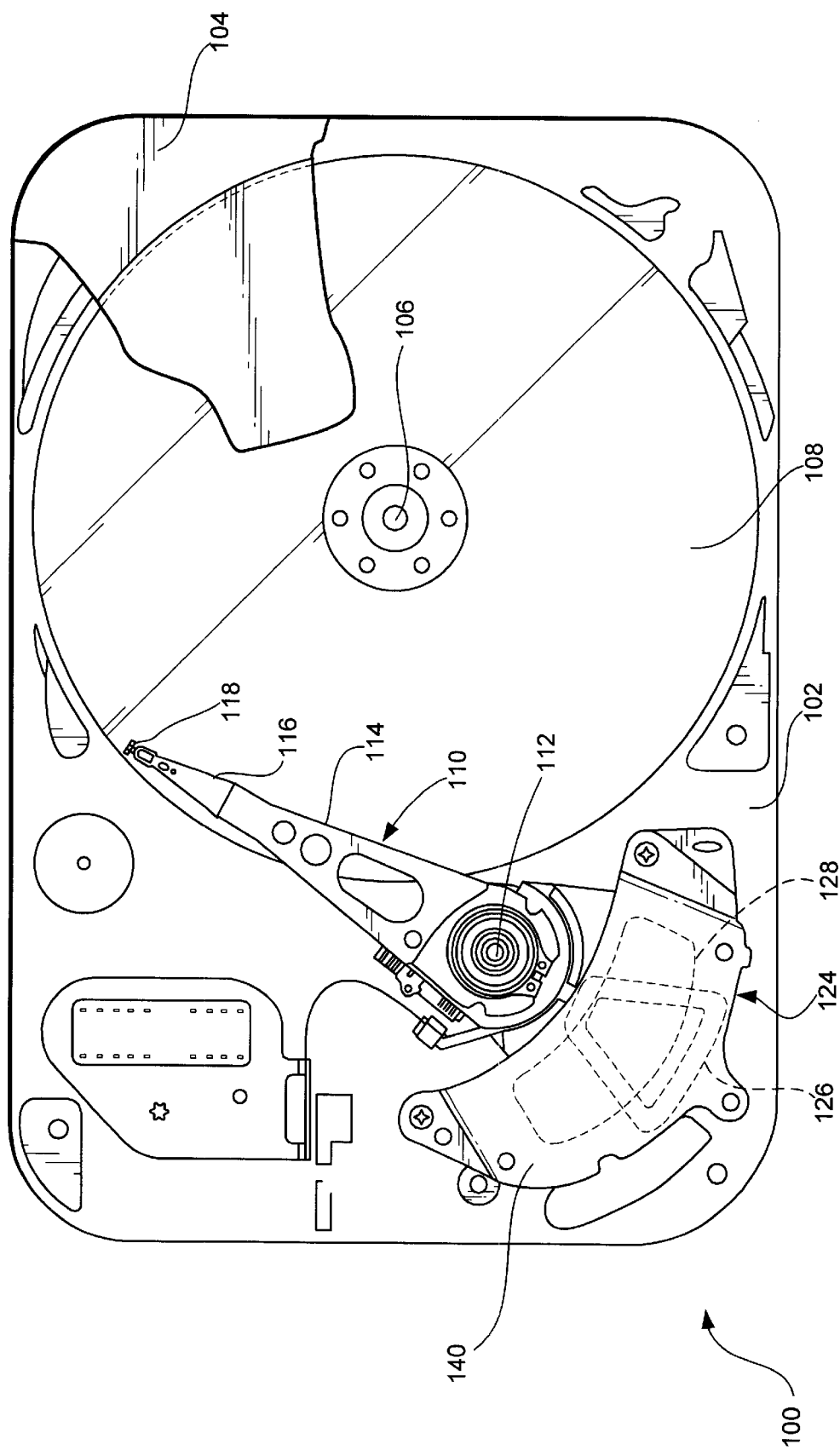
FIG. 1 is a plan view of a disc drive with its cover partially removed to reveal the primary internal components in accordance with a first embodiment of the present invention.

The invention is described in detail below with reference to the figures. When referring to the figures, like structures and elements shown throughout are indicated with like reference numerals.

A disc drive 100 constructed in accordance with a first embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106, which rotates one or more magnetic media discs 108 at a constant high speed about a center of the disc, or discs 108. A magnetic media disc 108 is used to illustrate a preferred embodiment of the present invention, but the present invention may be implemented using other types of data storage discs. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118, which includes an air bearing slider enabling the transducer head 118 to fly in close proximity above the corresponding surface of the associated disc 108.

During a seek operation, the track position of the transducer heads 118 is controlled through the use of a voice coil motor (VCM) 124, which includes a coil 126 attached to the actuator assembly 110. The coil 126 is immersed in the magnetic field of a magnetic circuit 144 (FIG. 5) of the VCM 124. In accordance with a first embodiment, the magnetic circuit 144 includes a single permanent magnet pair, or magnetic portion, 132 (FIG. 2) adjacent to a lower magnetically permeable magnet plate 130 (FIG. 2) and an upper magnetically permeable plate 140 having a raised plate portion 128 protruding towards and parallel to the permanent magnet pair 132. The controlled application of current to the coil 126 causes magnetic interaction between a magnetic field between the permanent magnet pair 132 and the raised plate portion 128 and the coil 126 so that the coil 126 moves in accordance with the well-known Lorentz relationship. As the coil 126 moves, the actuator assembly 110 pivots about the bearing shaft assembly 112, and the transducer heads 118 are caused to move over the surfaces of the discs 108.

Figure 2:
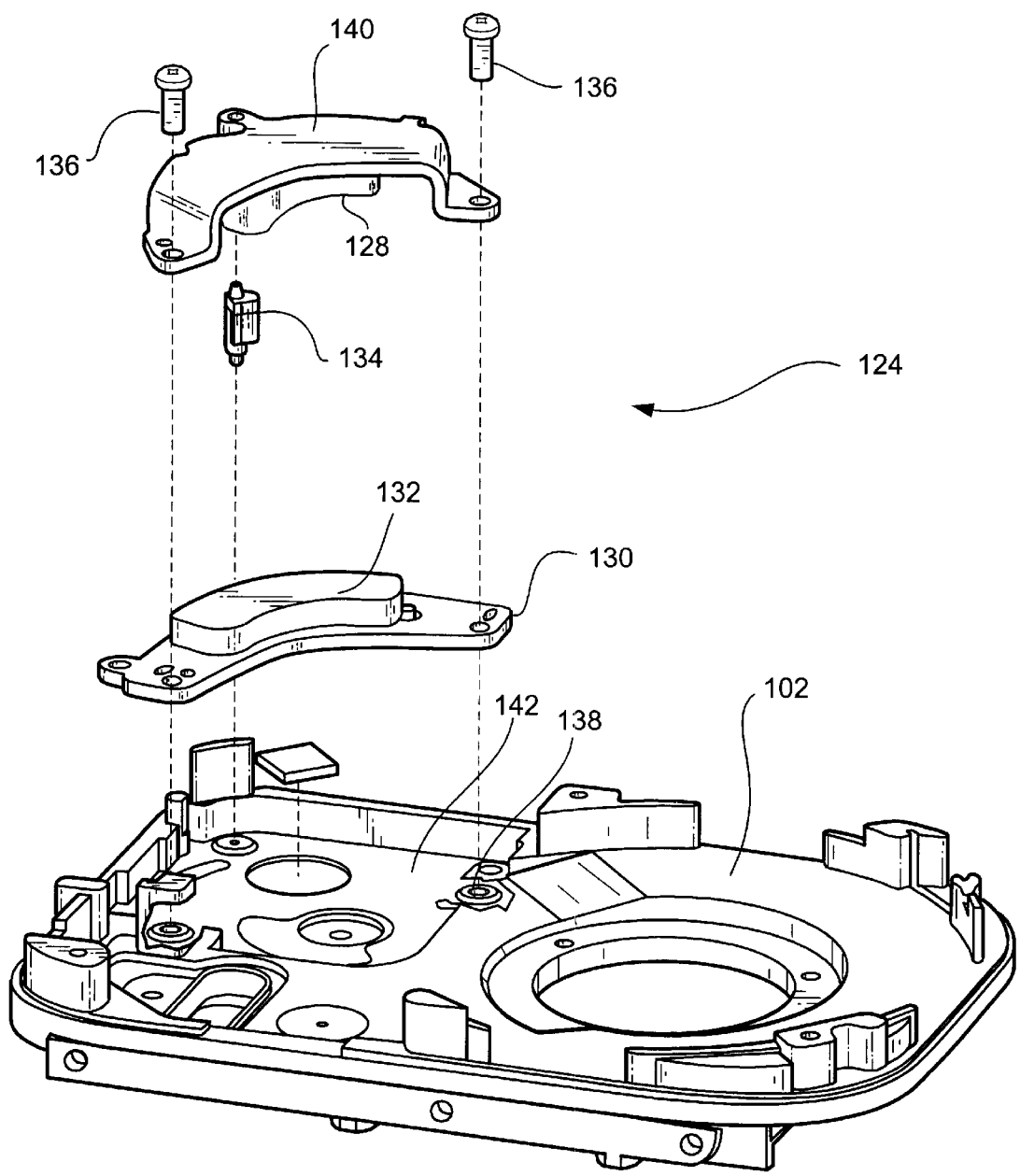
FIG. 2 is a simplified exploded view of the voice coil motor and stationary portions of the disc drive shown in FIG. 1.

FIG. 2 illustrates an exploded view of the disc drive 100 (FIG. 1), in accordance with the first embodiment, showing only selected components including a base plate 102, a lower magnetically permeable plate 130, an upper magnetically permeable plate 140 having a raised plate portion 128 protruding towards the lower magnetically permeable plate 130, a permanent magnet pair 132, a spacer 134, and a number of screws 136 that hold the upper magnetically permeable plate 140 to the lower magnetically permeable plate 130 and the VCM 124 to the base plate 102. As shown in FIG. 2, a number of bosses 138 located on, or integral with, the base plate 102, extend above an upper surface 142 of the base plate 102 and act as spacers, such that when the lower magnetically permeable plate 130 is attached to the base plate 102, the lower magnetically permeable plate 130 is held a distance above the upper surface 142 of the base plate 102.

Figure 5:
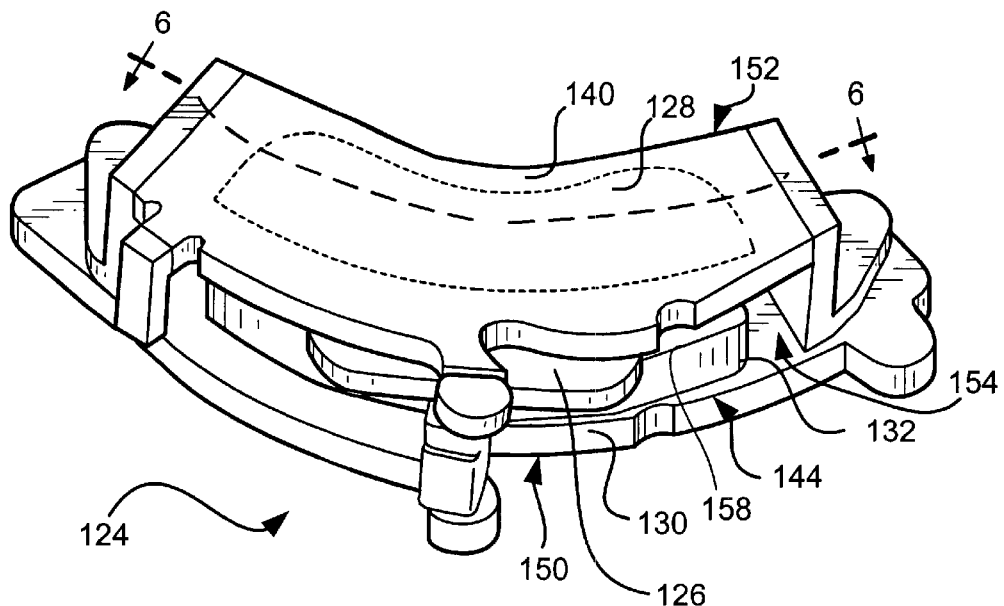
FIG. 5 is a simplified perspective view of the voice coil motor shown in FIG. 1 incorporating a permanent magnetic portion and a parallel raised plate portion.
Figure 6:
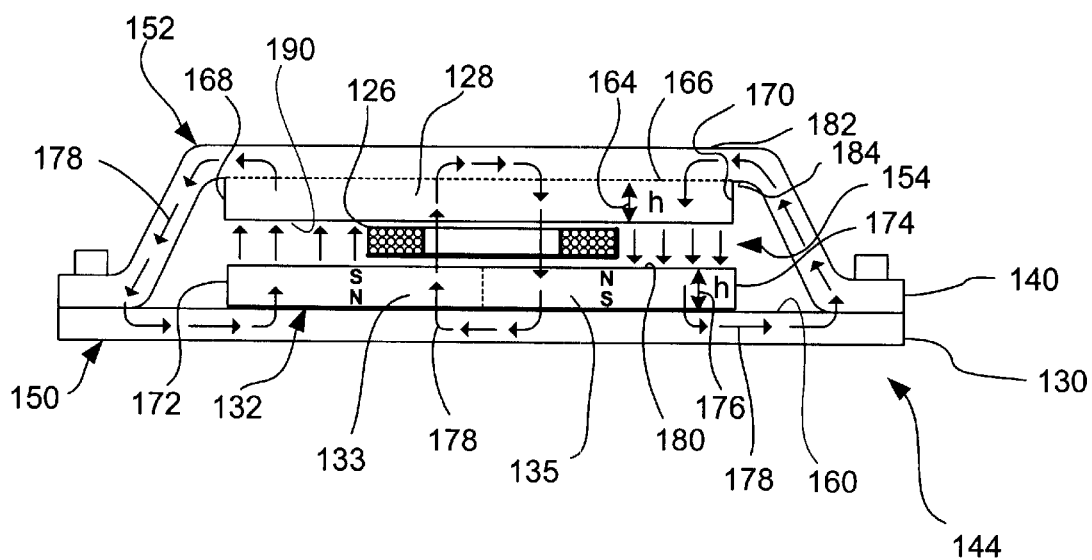
FIG. 6 is a simplified cross-sectional view of the voice coil motor taken along the line 6—6 in FIG. 5.

The VCM 124 is separately shown in FIGS. 5 and 6 in accordance with a first embodiment shown in FIGS. 1 and 2. Referring to FIG. 5, the VCM 124 has a magnetic circuit 144 incorporating a permanent magnet pair 132 and a raised plate portion 128. The VCM 124 includes a first, or lower, pole piece 150 and a second, or upper, pole piece 152 mounted over the lower pole piece 150, with an air gap 154 formed between the lower pole piece 150 and the upper pole piece 152. The lower pole piece 150 is preferably fastened against a base plate 102 (FIG. 1) of the disc drive 100 (FIG. 1). The upper pole piece 152 is preferably located between the lower pole piece 150 and a cover plate 104 (FIG. 1) of the disc drive 100. Indeed, the upper pole plate 152 and the lower pole plate 152 may be coupled to the cover plate 104 and the base plate 102, respectively.

The lower pole piece 150 includes a first, or lower, magnetically permeable plate 130 and the permanent magnet pair 132, which is mounted on the lower magnetically permeable plate 130 so that the permanent magnet pair 132 protrudes towards the air gap 154. The permanent magnet pair 132 includes two permanent magnets 133 and 135 that establish a magnetic field within the VCM 124. The upper pole piece 152 includes a second, or upper, magnetically permeable plate 140 having a raised plate portion 128 protruding towards the air gap 154. Since the raised plate portion 128 protrudes from a lower surface 184 (FIG. 6) of the upper magnetically permeable plate 140, the raised plate portion 128 is shown in FIG. 5 with a dashed line. The upper and the lower magnetically permeable plates 140 and 130 are formed from magnetically permeable material. The raised plate portion 128 is preferably formed using the same piece of magnetically permeable material from which the upper magnetically permeable plate 140 is formed. In which case, the raised plate portion 128 protrudes as a thickened portion of the upper magnetically permeable plate 140.

The lower magnetically permeable plate 130 is sized larger than the permanent magnet pair 132 and, as mentioned above, is made from material with a high degree of permeability in order to provide a magnetic field path for the permanent magnet pair 132. For example, the lower magnetically permeable plate 130 may be fabricated from ferromagnetic material such as iron, nickel, or steel. Likewise, the upper magnetically permeable plate 140 is preferably sized larger than the raised plate portion 128. The raised plate portion 128 is integral with the lower magnetically permeable plate 130 and made from material with a high degree of permeability in order to ensure that the magnetic flux lines (not shown) leave the permanent magnet pair 132 orthogonal to a top, or magnetic, planar surface 158 of the permanent magnet pair 132. A voice coil 126 is positioned within the air gap 154 between the upper pole piece 152 and the lower pole piece 150. The controlled application of current to the coil 126 causes magnetic interaction between the permanent magnet pair 132 and the coil 126 so that the coil 126 moves in accordance with the well-known Lorentz relationship. The coil 126 is pivotally mounted to the disc drive 100 (FIG. 1), thus allowing the coil 126 to move from side to side within the VCM 124.

The magnetic circuit 144 of the VCM 124 is shown in FIG. 6. In particular, FIG. 6 is a cross-sectional view of the VCM 124 taken along the line 6—6 in FIG. 5. The VCM 124 includes an upper pole piece 152 and a lower pole piece 150 supported in spaced relation to form a gap 154 therebetween. The upper pole piece 152 includes an upper magnetically permeable plate 140 having a top surface 182 and a bottom planar surface 184. The top surface 182 is preferably adjacent a top cover 104 (FIG. 1) of the disc drive 100 (FIG. 1) containing the VCM 124. The top surface 182 may even be coupled to the top cover 104. A raised plate portion 128 protrudes from the bottom planar surface 184 of the upper magnetically permeable plate 140 towards the gap 154. The raised plate portion 128 defines a raised planar surface 190 facing the gap 154. The raised plate portion 128, and thus the raised planar surface 190, preferably protrude from a substantially central portion of the bottom planar surface 184.

The lower pole piece 150 includes a lower magnetically permeable plate 130 and a permanent magnet pair 132. The permanent magnet pair 132 is mounted or positioned on a top planar surface 160 of the lower magnetically permeable plate 130. A magnetic planar surface 180 of the permanent magnet pair faces the gap 154 and is in a relatively parallel orientation to the raised planar surface 190. Additionally, a coil 126 is positioned within the gap 154 between the raised planar surface 190 and the magnetic planar surface 180.

As shown in FIGS. 5 and 6, the raised plate portion 128 in this embodiment is integral with the upper magnetically permeable plate 140, protruding downward into the gap 154. The upper magnetically permeable plate 140 is preferably formed having a thickened central portion being the raised plate portion 128. A dashed line 166 shows the thickened central portion of the upper magnetically permeable plate 140. Instead of being formed with the thickened central portion, the upper magnetically permeable plate 140 may be uniformly the same thickness and coupled to a second piece of magnetically permeable material being the raised plate portion 128.

The height 164 of the raised planar surface 190 from the upper magnetically permeable plate 140 is shown relative to the dashed line 166. The raised planar surface 190 has a length equal to the distance between a first end 168 and a second end 170 of the raised planar surface 190. Likewise, the magnetic planar surface 180 has a length equal to the distance between a first end 172 and a second end 174 of the magnetic planar surface 180. The surface areas of the magnetic planar surface 180 and the raised planar surface 190 are the total areas associated with each surface 180 and 190. In accordance with a preferred embodiment, the height 164 and surface area of the raised planar surface 190 are substantially equal to the height 176 and the surface area of the magnetic planar surface 180. Additionally, the shape of the raised planar surface 190, which preferably compliments the shape of the magnetic planar surface 180, may be substantially the same shape as the magnetic planar surface 180. The shape, height 164, and surface area of the raised planar surface 190 relative to the shape, height 176, and surface area of the magnetic planar surface 180 define the degree of uniformity associated with the orientation of the flux lines 178 of a magnetic field generated via the permanent magnet pair 132. The degree of uniformity refers to whether the flux lines 178 leave the permanent magnet pair 132 in an orthogonal orientation relative to the magnetic planar surface 180 of the permanent magnet pair 132. As described above, a non-orthogonal orientation is typically associated with fringed flux lines 178 resulting in unbalanced forces acting on the coil 126. Alternatively, the shape, height 164, or the surface area of the raised planar surface 190 may differ from the shape, height 176, and surface area, respectively, of the magnetic planar surface 180 in order to ensure orthogonal uniformity in the flux lines 178. In which case, the variances in the shape, the height 164, or the surface area of the raised planar surface 190 relative to the magnetic planar surface 180 may be determined based on the desired degree of uniformity.

The upper pole piece 152, including the raised plate portion 128, may be formed by a metal molding process, such that the top surface 182 of the upper pole piece 152 remains flush and a protrusion (the raised plate portion 128) is formed in a bottom planar surface 184 of the upper pole piece 152 as shown in FIG. 6. The raised plate portion 128 preferably has approximately the same shape and size as the permanent magnet pair 132. As shown in FIG. 5, the raised plate portion 128 and the permanent magnet pair 132 may be roughly semicircular in shape such that as the coil 126 pivots about the bearing shaft assembly 112 (FIG. 1) during operation of the VCM 124, the coil 126 will remain substantially between the permanent magnet pair 132 and the raised plate portion 128. Since the raised plate portion 128 in this embodiment is preferably integrated into the upper magnetically permeable plate 140 by a mold, the cross-sectional area of the raised plate portion 128 is greater than the cross-sectional area associated with any other portion between the top surface 182 and the bottom planar surface 184 of the upper magnetically permeable plate 140.

Figure 3:
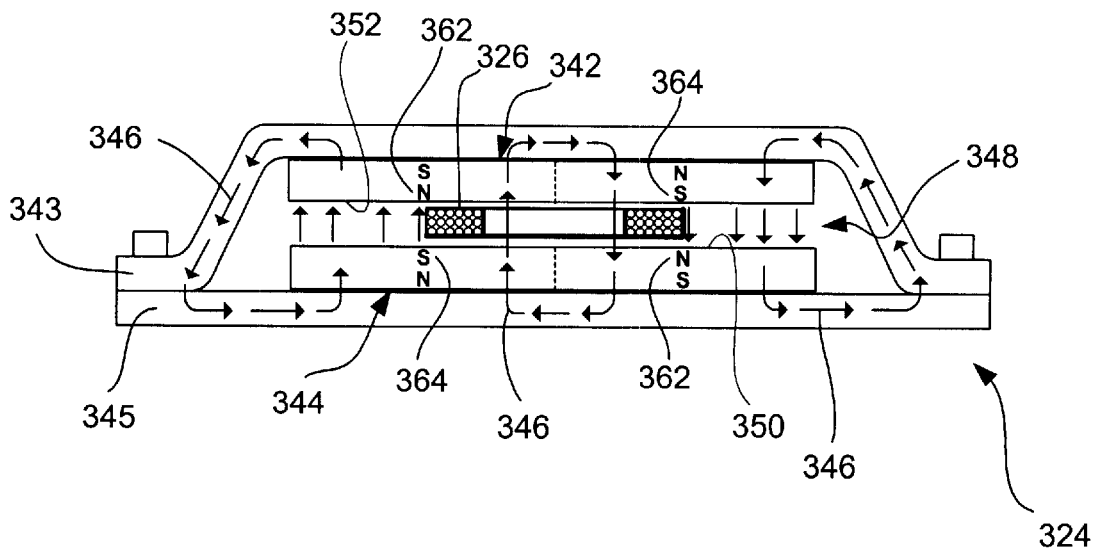
FIG. 3 shows a magnetic circuit of a voice coil motor incorporating a pair of permanent magnetic portions extending from top and bottom poles of the voice coil motor.
Figure 4:
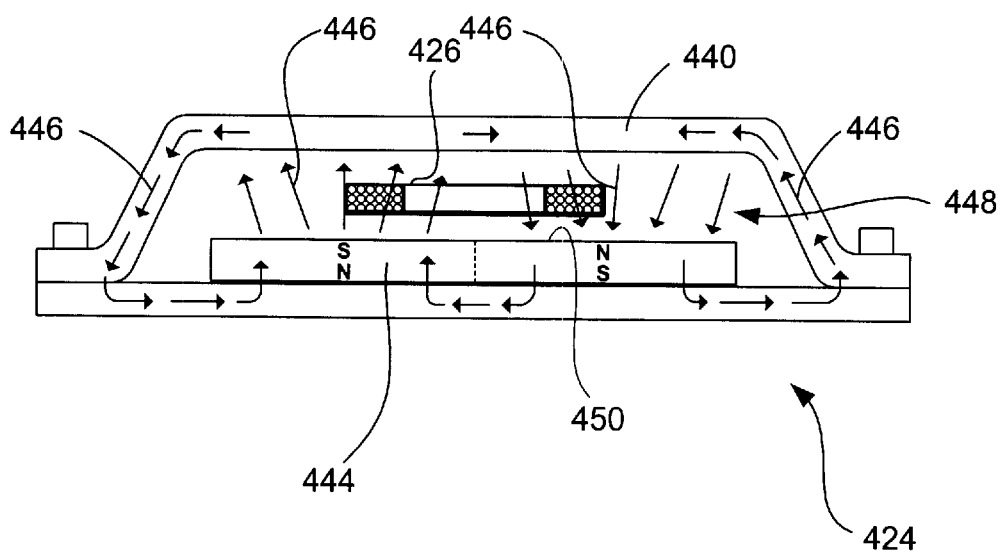
FIG. 4 shows a magnetic circuit of a voice coil motor incorporating a single permanent magnet pair extending from a bottom pole of the voice coil motor.

Forming the upper pole piece 140 and the raised plate portion 128 by the aforementioned molding process allows for the production of precise and repeatable upper pole pieces/raised plate portions in an efficient and cost effective manner. The use of a raised plate portion 128 rather than an upper magnet pair 362 (FIG. 3) in a VCM 124 also provides significant cost savings, as the cost associated with material and manufacturing of the upper pole pieces/raised plate portions is less than the cost of the material and manufacturing of an upper magnet pair 362 in conjunction with an upper magnet plate 342 (FIG. 3). Additionally, the use of a raised plate portion 128 in a single magnet pair VCM, as herein described, provides performance improvements over a single magnet pair VCM which does not employ a raised plate portion 128 by providing a high permeance path for the flow of magnetic flux 178 of the permanent magnet pair 132, thereby directing or steering the flux 178 across the gap 154 such that the flux 178 remains substantially orthogonal to the magnetic planar surface 180 of the permanent magnet pair 132.

Figure 7:
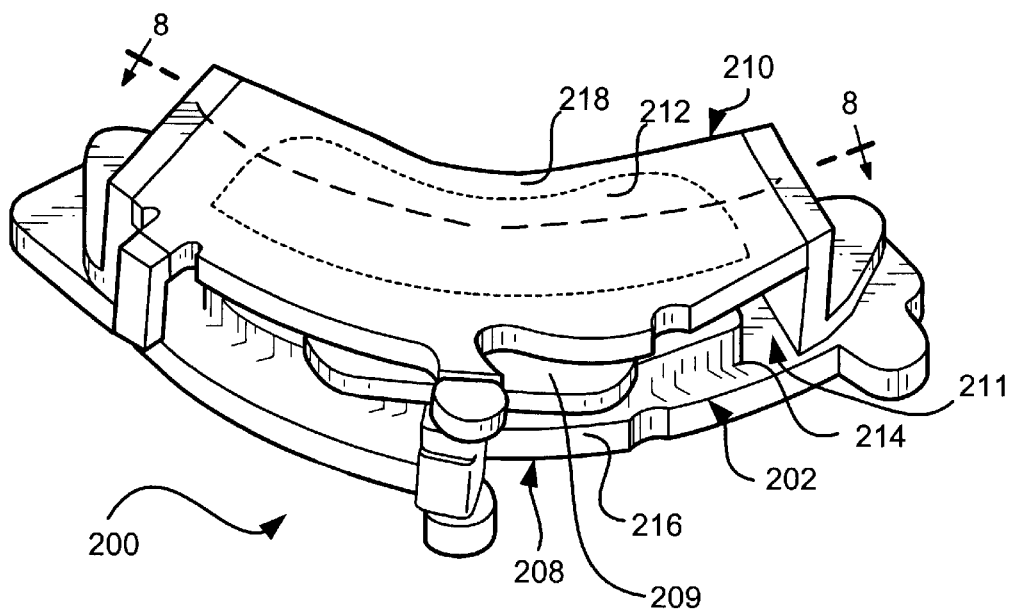
FIG. 7 is a simplified perspective view of the voice coil motor in accordance with a second embodiment of the present invention.

In FIG. 7, a VCM 200 incorporating aspects of the VCM 124 shown in FIG. 2 and having a magnetic circuit 202 incorporating a permanent magnet pair, or magnetic portion, 212 and a parallel raised plate portion 214 is shown in accordance with a second embodiment of the present invention. The VCM 200 includes a first, or upper, pole piece 210 and a second, or lower, pole piece 208. The upper pole piece 210 is mounted over the lower pole piece 208, with an air gap 211 formed between the lower pole piece 208 and the upper pole piece 210. The lower pole piece 208 is preferably fastened to a base plate 102 (FIG. 1) of the disc drive 100 (FIG. 1). The upper pole piece 210 is preferably located between lower pole piece 208 and a cover plate 104 (FIG. 1) of the disc drive 100. Indeed, the upper pole piece 210 and the lower pole piece 208 may be coupled to the cover plate 104 and the base plate 102, respectively.

The upper pole piece 210 includes a first, or upper, magnetically permeable plate 218 and the permanent magnet pair 212 which is mounted to a lower surface 252 (FIG. 8) on the upper magnetically permeable plate 218 so that the permanent magnet pair 212 protrudes towards the air gap 211. Since the permanent magnet pair 212 is located on the lower surface 252 of the upper magnetically permeable plate 218, the permanent magnet pair 212 is shown in FIG. 7 with a dashed line. The permanent magnet pair 212 includes two permanent magnets 260 and 262 (FIG. 8) that establish a magnetic field within the VCM 200. The lower pole piece 208 includes a second, or lower, magnetically permeable plate 216 and the raised plate portion 214 protruding towards the air gap 211 from an upper planar surface 242 on the lower magnetically permeable plate 216. The upper and the lower magnetically permeable plates 216 and 218 are formed from magnetically permeable material. The raised plate portion 214 is preferably formed using the same piece of magnetically permeable material from which the lower magnetically permeable plate 216 is formed. In which case, the raised plate portion 214 protrudes as a thickened portion of the lower magnetically permeable plate 216.

The upper magnetically permeable plate 218 is sized larger than the permanent magnet pair 212 and, as mentioned above, is made from material with a high degree of permeability in order to provide a magnetic field path for the permanent magnet pair 212. For example, the upper magnetically permeable plate 218 may be fabricated from ferromagnetic material such as iron, nickel, or steel. Likewise, the lower magnetically permeable plate 216 is preferably sized larger than the raised plate portion 214. The raised plate portion 214 is integral with the lower magnetically permeable plate 216 and made from material with a high degree of permeability in order to ensure that the magnetic flux lines (not shown) leave the magnetic portion 212 orthogonal to a bottom, or magnetic, planar surface 244 (FIG. 8) of the magnetic portion 212. A voice coil 209 is positioned within the air gap 211 between the upper pole piece 210 and the lower pole piece 208. The controlled application of current to the coil 209 causes magnetic interaction between the permanent magnet pair 212 and the coil 209 so that the coil 209 moves in accordance with the well-known Lorentz relationship. The coil 209 is pivotally mounted to the disc drive 100 (FIG. 1), thus allowing the coil 209 to move from side to side within the VCM 124 (FIG. 1).

Figure 8:
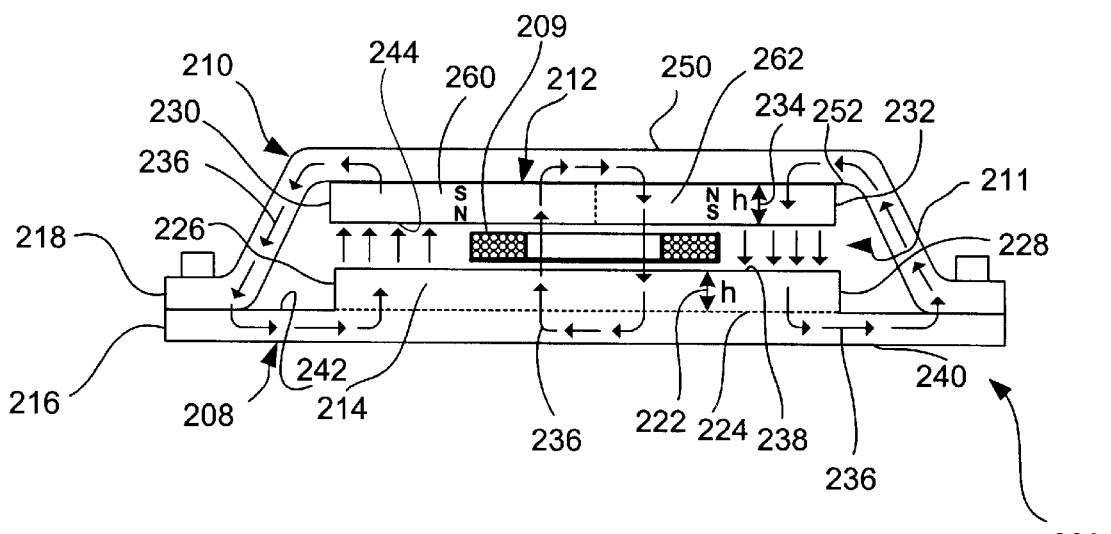
FIG. 8 is a simplified cross-sectional view of the voice coil motor taken along the line 8—8 in FIG. 7.

The magnetic circuit 202 of the VCM 200 is shown in FIG. 8. In particular, FIG. 8 is a cross-sectional view of the VCM 200 taken along the line 8—8 in FIG. 7. The VCM 200 includes an upper pole piece 210 and a lower pole piece 208 supported in spaced relation to form a gap 211 therebetween. The lower pole piece 208 includes a lower magnetically permeable plate 216 having a top planar surface 242 and a bottom surface 240. The bottom surface 240 is preferably adjacent a base plate 102 (FIG. 1) of the disc drive 100 (FIG. 1) containing the VCM 200. The bottom surface 242 may even be coupled to the base plate 102. A raised plate portion 214 protrudes from the top planar surface 242 of the lower magnetically permeable plate 216 towards the gap 211. The raised plate portion 214 defines a raised planar surface 238 facing the gap 211. The raised plate portion 214, and thus the raised planar surface 238, preferably protrude from a substantially central portion of the top planar surface 242 of the lower magnetically permeable plate 216.

The upper pole piece 210 includes an upper magnetically permeable plate 218 having a top surface 250 and a bottom planar surface 252. The top surface 250 is preferably adjacent a top cover 104 (FIG. 1) of the disc drive 100 (FIG. 1) containing the VCM 200. The top surface 250 may even be coupled to the top cover 104. A permanent magnet pair, or magnetic portion, 212 is mounted to the bottom planar surface 252 of the upper magnetically permeable plate 218 such that the permanent magnet pair 212 protrudes towards the gap 211.

A magnetic planar surface 244 of the permanent magnet pair 212 faces the gap 211 and is in a relatively parallel orientation to the raised planar surface 238. Additionally, a coil 209 is positioned within the gap 211 between the raised plate portion 214 and the permanent magnet pair 212.

As shown in FIGS. 7 and 8, the raised plate portion 214 in this embodiment is integral with the lower magnetically permeable plate 216, extending upward into the gap 211.

The lower magnetically permeable plate 216 is preferably formed having a thickened central portion being the raised plate portion 214. A dashed line 224 shows the thickened central portion of the lower magnetically permeable plate 216. Instead of being formed with a thickened central portion, the lower magnetically permeable plate 216 may be uniformly the same thickness and coupled to a second piece of magnetically permeable material being the raised plate portion 214.

The height 222 of the raised planar surface 238 is shown relative to the dashed line 224. The raised planar surface 238 has a length equal to the distance between a first end 226 and a second end 228. Likewise, the magnetic planar surface 244 has a length equal to the distance between a first end 230 and a second end 232. The surface areas of the magnetic planar surface 244 and the raised planar surface 238 are the total areas associated with each surface 244 and 238. In accordance with a preferred embodiment, the height 222 and surface area of the raised planar surface 238 are substantially equal to the height 234 and the surface area of the magnetic planar surface 244. Additionally, the shape of the raised planar surface 238, which preferably compliments the shape of the magnetic planar surface 244, may be substantially the same shape as the shape of the magnetic planar surface 244. The shape, height 222, and surface area of the raised planar surface 238 relative to the shape, height 234, and width of the magnetic planar surface 244 define the degree of uniformity associated with the orientation of the flux lines 236 of a magnetic field generated via the permanent magnet pair 212. The degree of uniformity refers to whether the flux lines 236 leave the permanent magnet pair 212 in an orthogonal orientation relative to the magnetic planar surface 244. As described above, a non-orthogonal orientation is typically associated with fringed flux lines 236, which result in unbalanced forces acting on the coil 209. Alternatively, the shape, height 222, or the surface area of the raised planar surface 238 may differ from the shape, height 234, and surface area, respectively, of the magnetic planar surface 244 in order to ensure orthogonal uniformity in the flux lines 236. In which case, the variances in the shape, the height 222, or the surface area of the raised planar surface 238 relative to the magnetic planar surface 244 may be determined based on the desired degree of uniformity.

The lower pole piece 208, including the raised plate portion 214, may be formed by a metal molding process, such that the bottom surface 240 of the lower pole piece 208 remains flush and a protrusion (the raised plate portion 214) is formed in the top planar surface 242 of the lower pole piece 208 as shown in FIG. 8. The raised plate portion 214 preferably has approximately the same shape and size as the permanent magnet pair 212. As shown in FIG. 7, the raised plate portion 214 and the permanent magnet pair 212 may be roughly semicircular in shape such that as the coil 204 pivots about the bearing shaft assembly 112 (FIG. 1) during operation of the VCM 220, the coil 209 will remain substantially between the permanent magnet pair 212 and the raised plate portion 214. Since the raised plate portion 214 in this embodiment is preferably integrated into the lower magnetically permeable plate 216 by a mold, the cross-sectional area of the raised plate portion 214 is greater than the cross-sectional area associated with any other portion between the bottom surface 240 and the top planar surface 242 of the lower magnetically permeable plate 216.

Forming the lower pole piece 208 and the raised plate portion 214 by the aforementioned molding process allows for the production of precise and repeatable upper pole pieces/raised plate portions in an efficient and cost effective manner. The use of a raised plate portion 214 rather than an upper magnet pair 362 (FIG. 3) in a VCM also provides significant cost savings, as the cost associated with material and manufacturing of the upper pole pieces/raised plate portions is less than the cost of the material and manufacturing of an upper magnet pair 362 in conjunction with an upper magnet plate 342. Additionally, the use of a raised plate portion 214 in a single magnet pair VCM, as herein described, provides performance improvements over a single magnet pair VCM which does not employ a raised plate portion 214 by providing a high permeance path for the flow of magnetic flux 236 of the permanent magnet pair 212, thereby directing or steering the flux 236 across the gap 211 such that the flux 236 remains substantially orthogonal to the magnetic planar surface 244 of the permanent magnet pair 212.

In summary, the present invention may be viewed as a disc drive (such as 100) having a data storage disc (such as 108) rotatably mounted on a base plate (such as 102). The disc drive (such as 100) also has an actuator (such as 110) mounted on the base plate (such as 102) adjacent the disc (such as 108) for moving a transducer (such as 118) over the disc (such as 108). Furthermore, the disc drive (such as 100) has a voice coil motor (such as 124) coupled to the actuator (such as 110).

The voice coil motor (such as 124) includes a voice coil (such as 126), a first plate (such as 130), and a permanent magnet pair (such as 132) coupled to the first plate (such as 130). The permanent magnet pair (such as 132) defines a magnetic planar surface (such as 180) and produces a magnetic flux (such as 178). The voice coil motor (such as 124) also includes a second plate (such as 140) having a planar surface (such as 184) and a raised plate portion (such as 128) protruding from the second plate planar surface (such as 184). The second plate (such as 140) is positioned in spaced relation to the first plate (such as 130) forming an air gap (such as 154) between the raised plate portion (such as 128) and the permanent magnet pair (such as 132) through which the voice coil (such as 126) is free to move. The raised plate portion (such as 128) defines a raised planar surface (such as 190) opposite the magnetic planar surface (such as 180) such that the magnetic flux (such as 178) passing across the air gap (such as 154) between the permanent magnet pair (such as 132) and the raised plate portion (such as 128) is substantially uniformly directed orthogonal to the magnetic planar surface (such as 180).

The second plate (such as 140) may be formed from a single piece of magnetically permeable material such that the raised plate portion (such as 128) is preferably a thickened central portion (such as 128) of the second plate (such as 140) formed from the single piece of magnetically permeable material. Alternatively, the raised plate portion (such as 128) may be a thickened central portion (such as 128) of the second plate (such as 140) that is formed from a different piece of magnetically permeable material from which the second plate (such as 140) is formed. In which case, the raised plate portion (such as 128) is preferably attached to the second plate (such as 140).

The first plate (such as 130) may be fastened against a base plate (such as 102) of the disc drive (such as 100). Alternatively, the second plate (such as 140) may be fastened against a base plate of the disc drive. Additionally, the raised planar surface (such as 190) may have a surface shape substantially identical to the shape of the magnetic planar surface (such as 180).

The raised planar surface (such as 190) may have a surface area less than a surface area of the magnetic planar surface (such as 180). Alternatively, the raised planar surface (such as 190) may have a surface area larger than a surface area of the magnetic planar surface (such as 180). Additionally, the raised planar surface (such as 190) may be raised to a height (such as 164) greater than a height (such as 176) of the magnetic planar surface (such as 180) from the first plate (such as 130) or the raised planar surface (such as 190) may be raised to a height (such as 164) less than the a height (such as 176) of the magnetic planar surface (such as 180) from the first plate (such as 130).

The present invention may also be viewed as a data handling system (such as 100) configured for improved positioning and including a top pole (such as 152) and a bottom pole (such as 150) spaced from the top pole (such as 152) forming a gap (such as 154) therebetween. A permanent magnet pair (such as 132) is supported by a first one (such as 150) of the top (such as 152) and bottom (such as 150) poles. The permanent magnet pair (such as 132) has a planar surface shape (such as 158) and produces a magnetic flux passing between the top pole (such as 152) and the bottom pole (such as 150). The data handling system (such as 100) also includes a means (such as 128) for extending another one (such as 152) of the top (such as 152) and bottom (such as 150) poles to direct the magnetic flux from the permanent magnet pair (such as 132) directly across the gap (such as 154).

The extending means (such as 128) may include a raised plate portion (such as 128) protruding from the top pole (such as 152) toward the bottom pole (such as 150). Alternatively, the extending means (such as 128) may include a raised plate portion (such as 128) protruding from the bottom pole (such as 150) toward the top pole (such as 152). The extending means (such as 128) may be a raised planar surface (such as 190) parallel to the planar surface shape (such as 158) of the permanent magnet pair (such as 132). In accordance with one embodiment, the raised planar surface (such as 190) may have a surface shape complimentary to the planar surface shape (such as 158) of the permanent magnet pair (such as 132). Furthermore, the surface shape of the raised planar surface (such as 190) may be substantially the same as the planar surface shape (such as 158) of the permanent magnet pair (such as 132).

It will be clear that the present invention is well adapted to attain the ends and advantages mentioned as well as those inherent therein. While the presently preferred embodiments have been described for purposes of this disclosure, various changes and modifications may be made which are well within the scope of the present invention. For example, the present invention may be adapted for use in an optical disc drive configuration, such as a Compact Disk (CD) or Digital Versatile Disk (DVD). Importantly, two pieces of magnetically permeable material may be used to construct the pole having the raised plate portion. In which case, the raised plate portion is preferably a smaller shaped flat piece in the shape of the permanent magnet pair. Such a design may be easier to fabricate than forming the magnetically permeable plate having a varying thickness of the raised plate portion. Furthermore, the top and bottom surfaces of the upper and lower magnetically permeable plates that are not coupled to the permanent magnet pairs or that are not thickened by the protruding raised plate portion might have either planar or non-planar surfaces. For example, such non-planar surfaces may be rectangular, triangular, or rounded.

The relative thicknesses of the raised plate portion could be modified to optimize uniformity and direct magnetic flux lines in a substantially orthogonal orientation to the magnetic planar surface of the permanent magnet pair. Moreover, the shape of the raised plate portion relative to the permanent magnet pair may be varied to optimize uniformity and direct magnetic flux lines in an orthogonal orientation to the magnetic planar surface of the permanent magnet pair. For example, the shape of the raised plate portion may be constructed slightly smaller to or slightly larger than the shape of the permanent magnet pair. Additionally, the raised plate portion may contain protrusions that have no corresponding portion on the permanent magnet pair. Also, portions of the raised plate portion may be undercut relative to the permanent magnet pair. Furthermore, the shape of the raised planar surface may be different from the shape of the magnetic planar surface. The raised planar surface may also have a different length or width than the magnetic planar surface. Moreover, numerous other changes, combinations, and arrangements of techniques may be made which will readily suggest themselves to those skilled in the art and which are encompassed in the spirit of the invention disclosed and as defined in the appended claims.

What is claimed is:

1. A disc drive having a data storage disc rotatably mounted on a base plate, an actuator mounted on the base plate adjacent the disc for moving a transducer over the disc, and a voice coil motor coupled to the actuator, the voice coil motor comprising:

a voice coil;

a first magnetically permeable plate;

a permanent magnet pair coupled to the first magnetically permeable plate, the permanent magnet pair defining a magnetic planar surface and producing a magnetic flux; and a second magnetically permeable plate having a planar surface and a raised magnetically permeable plate portion protruding from the second plate planar surface, the raised plate portion defining a raised planar surface parallel to the second plate planar surface and opposite the magnetic planar surface and being formed of non-permanent magnetic material, wherein the second plate is positioned in spaced relation to the first plate forming an air gap between the raised planar surface and the magnetic planar surface through which the voice coil is free to move, the raised planar surface having a shape complimentary to a surface shape of the magnetic planar surface such that the magnetic flux passing across the air gap between the permanent magnet pair and the raised plate portion is substantially uniformly directed through the voice coil in a direction orthogonal to the magnetic planar surface.

2. A disc drive as defined in claim 1, wherein the second plate is formed from a single piece of magnetically permeable material.

3. A disc drive as defined in claim 2, wherein the raised plate portion is a thickened central portion of the second plate formed from the single piece of magnetically permeable material.

4. A disc drive as defined in claim 2, wherein the raised plate portion is a thickened central portion of the second plate formed from a different piece of magnetically permeable material than the second plate, the raised plate portion being attached to the second plate.

5. A disc drive as defined in claim 1, wherein the first plate is fastened against a base plate of the disc drive.

6. A disc drive as defined in claim 1, wherein the second plate is fastened against a base plate of the disc drive.

7. A disc drive as defined in claim 1 wherein the shape of the raised planar surface is substantially the same as the surface shape of the magnetic planar surface.

8. A disc drive as defined in claim 1, wherein the raised planar surface has a surface area less than a surface area of the magnetic planar surface.

9. A disc drive as defined in claim 1, wherein the raised planar surface has a surface area larger than a surface area of the magnetic planar surface.

10. A disc drive as defined in claim 1, wherein the raised planar surface is raised to a height greater than a height of the magnetic planar surface from the first plate.

11. A disc drive as defined in claim 1, wherein the raised planar surface is raised to a height less than the a height of the magnetic planar surface from the first plate.

12. A data handling system configured for improved positioning, the system comprising:
   a voice coil;
   a magnetically permeable top pole;
   a magnetically permeable bottom pole spaced from the top pole forming a gap therebetween through which the voice coil is free to move;
   a permanent magnet pair supported by one of the top and bottom poles, the permanent magnet pair having a planar surface shape of a predefined width and producing a magnetic flux passing between the top pole and the bottom pole; and
   means for extending another one of the top and bottom poles using non-permanent magnetic material to direct the magnetic flux from the permanent magnet pair directly across the voice coil in a direction orthogonal to the planar surface shape over the predefined width of the planar surface shape.

13. A data handling system as defined in claim 12 wherein the extending means includes a raised plate portion protruding from the top pole toward the bottom pole.

14. A data handling system as defined in claim 12 wherein the extending means includes a raised plate portion protruding from the bottom pole toward the top pole.

15. A data handling system as defined in claim 12 wherein the extending means is a raised planar surface parallel to the planar surface shape of the permanent magnet pair.

16. A data handling system as defined in claim 15 wherein the raised planar surface has a surface shape complimentary to the planar surface shape of the permanent magnet pair.

17. A data handling system as defined in claim 16 wherein the surface shape of the raised planar surface is substantially the same as the planar surface shape of the permanent magnet pair.

* * * * *